(12) United States Patent
Payrits (10) Patent No.: US 7,418,485 B2
(45) Date of Patent: Aug. 26, 2008

(54) SYSTEM AND METHOD FOR ADDRESSING NETWORKED TERMINALS VIA PSEUDONYM TRANSLATION

(75) Inventor: Szabolcs Payrits, Kophaza (HU)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 10/422,352

(22) Filed: Apr. 24, 2003

(65) Prior Publication Data

US 2004/0215824 A1  Oct. 28, 2004

(51) Int. Cl.
G06F 15/16 (2006.01)
H04Q 7/20 (2006.01)
G06F 15/173 (2006.01)

(52) U.S. Cl. .............. 709/220; 709/236; 715/239; 455/436; 455/557

(58) Field of Classification Search .............. 709/229, 709/200, 217–228, 236; 719/316; 715/236–239; 455/431–440, 557; 707/200
See application file for complete search history.

(56) References Cited

U.S. PATENT DOCUMENTS

| | | |
|---|---|---|
| 6,421,714 B1 | 7/2002 | Rai et al. |
| 6,473,413 B1 | 10/2002 | Chiou et al. |
| 6,640,097 B2 | 10/2003 | Corrigan et al. |
| 6,654,363 B1 | 11/2003 | Li et al. |
| 6,728,215 B1 | 4/2004 | Alperovich et al. |
| 6,742,036 B1 | 5/2004 | Das et al. |
| 6,785,255 B2 | 8/2004 | Satri et al. |
| 6,829,474 B1 | 12/2004 | Adachi |
| 6,915,345 B1 | 7/2005 | Tummala et al. |
| 6,934,756 B2 | 8/2005 | Maes |
| 6,937,588 B2 | 8/2005 | Park |
| 6,957,262 B2 | 10/2005 | Kimura et al. |
| 7,031,718 B2 | 4/2006 | Jouppi et al. |
| 7,103,676 B2 * | 9/2006 | Payrits et al. ............ 709/236 |
| 2001/0019951 A1 | 9/2001 | Haumont et al. |
| 2001/0044849 A1 | 11/2001 | Ndili et al. |
| 2002/0034941 A1 | 3/2002 | Patil et al. |
| 2002/0059452 A1 | 5/2002 | Yokota et al. |
| 2002/0087674 A1 | 7/2002 | Guilford et al. |
| 2002/0123335 A1 | 9/2002 | Luna |
| 2002/0154642 A1 | 10/2002 | Hagirahim et al. |
| 2002/0155848 A1 | 10/2002 | Suryanarayana |
| 2002/0156831 A1 | 10/2002 | Suorsa et al. |
| 2002/0174117 A1 | 11/2002 | Nynkanen |
| 2002/0184373 A1 | 12/2002 | Maes |
| 2002/0186684 A1 | 12/2002 | Shaughnessy et al. |

(Continued)

OTHER PUBLICATIONS

Liberty Alliance Project, "Liberty Architecture Overview," Version 1.1, Jan. 15, 2003.

(Continued)

Primary Examiner—Haresh N Patel
(74) Attorney, Agent, or Firm—Hollingsworth & Funk, LLC (57) ABSTRACT

A system, apparatus, and method for performing terminal address translation, and more particularly for identifying addresses of mobile terminals in a mobile network in order to communicate messages with the mobile terminals. Messages are received from a service consumer at a pseudonymity proxy operable within the mobile network, where the message includes an information exchange message including a pseudonym locally identifying a target mobile terminal. The pseudonym is translated into an address of the target mobile terminal unknown to the service consumer. The information exchange message is forwarded from the pseudonymity proxy to the address of the target mobile terminal.

28 Claims, 8 Drawing Sheets

U.S. PATENT DOCUMENTS

| | | | |
|---|---|---|---|
| 2002/0187775 | A1 | 12/2002 | Corrigan et al. |
| 2003/0005132 | A1 | 1/2003 | Nguyen et al. |
| 2003/0009523 | A1* | 1/2003 | Lindskog et al. ............ 709/205 |
| 2003/0013434 | A1 | 1/2003 | Rosenberg et al. |
| 2003/0018704 | A1 | 1/2003 | Polychronidis et al. |
| 2003/0031160 | A1 | 2/2003 | Gibson Ang et al. |
| 2003/0033369 | A1 | 2/2003 | Bernhard |
| 2003/0050051 | A1 | 3/2003 | Vilander |
| 2003/0065805 | A1 | 4/2003 | Barnes |
| 2003/0072451 | A1 | 4/2003 | Pimentel et al. |
| 2003/0074456 | A1* | 4/2003 | Yeung et al. ................ 709/229 |
| 2003/0078962 | A1 | 4/2003 | Fabbricatore et al. |
| 2003/0084177 | A1 | 5/2003 | Mulligan |
| 2003/0095540 | A1 | 5/2003 | Mulligan et al. |
| 2003/0105864 | A1 | 6/2003 | Mulligan et al. |
| 2003/0172090 | A1* | 9/2003 | Asunmaa et al. ............ 707/200 |
| 2003/0185359 | A1 | 10/2003 | Moore et al. |
| 2003/0187992 | A1* | 10/2003 | Steenfeldt et al. ........... 709/227 |
| 2003/0190887 | A1 | 10/2003 | Hook et al. |
| 2004/0087336 | A1* | 5/2004 | Payrits et al. ............... 455/557 |
| 2004/0148434 | A1 | 7/2004 | Matsubara et al. |
| 2005/0004968 | A1 | 1/2005 | Mononen et al. |
| 2005/0071419 | A1 | 3/2005 | Lewontin |
| 2005/0071423 | A1 | 3/2005 | Rajamiemi |
| 2005/0071448 | A1 | 3/2005 | Katz et al. |
| 2006/0015579 | A1 | 1/2006 | Sastri et al. |

OTHER PUBLICATIONS

W3C Recommendation Mar. 25, 2003, "XPointer Framework," http://www.w3.org/TR/2003/REC-xptr-framework-20030325, printed from internet Jul. 24, 2003.

Liberty Alliance Project, "Liberty Reverse HTTP Binding 1.0", Version 1.0-07, 2003.

W3C Recommendation, "SOAP Version 1.2 Part 1: Messaging Framework", Jun. 26, 2002, http://www.w3.org/TR/2002/WD-soap12-part1-20020626, printed from internet Jan. 21, 2004.

W3C Recommendation, "SOAP Version 1.2 Part 2: Adjuncts", Jun. 26, 2002, http://www.w3.org/TR/2002/WD-soap12-part2-20020626, printed from internet Jan. 21, 2004.

Wireless Application Protocol, "Architecture Specification", WAP-210-WAPArch-20010712, Jul. 12, 2001.

Wireless Application Protocol, "Push OTA Protocol", WAP-235-PushOTA-20010425-a, Apr. 25, 2001.

Dearson, Internet Engineering Taskforce, "SIP for SOAP Sessions", Apr. 23, 2002, http://www.potaroo.net/ietf/old-ids/draft-dearson-sipping-soap-sessions-00.txt, printed from internet Jan. 21, 2004.

Handley et al., Network Working Group, "SIP: Session Initiation Procotol", RFC 2543, Mar. 1999, http://www.ietf.org/rfc/rfc2543.txt, printed from internet Jan. 21, 2004.

"SMS Text Messaging Web Service", www.webservicebuy.com, last updated Oct. 17, 2001, pp. 1-105.

* cited by examiner

SYSTEM AND METHOD FOR ADDRESSING NETWORKED TERMINALS VIA PSEUDONYM TRANSLATION

FIELD OF THE INVENTION

This invention relates in general to addressing networked terminals, and more particularly to a system, apparatus, and method for translating mobile terminal pseudonyms to operable network addresses without compromising confidentiality of user and/or mobile terminal information.

BACKGROUND OF THE INVENTION

Advances in communication infrastructures and protocols have turned standard computing devices into valuable communication tools. Computers communicate with each other, and with other electronic devices, over networks ranging from Local Area Networks (LANs) to wide reaching Global Area Networks (GANs) such as the Internet.

Other electronic devices have experienced similar transformations, such as mobile phones, Personal Digital Assistants (PDAs), and the like. Today, these wireless devices are being used for a variety of different types of communication. For example, current and anticipated mobile phone technologies have transformed these wireless devices into powerful communication tools capable of communicating voice, data, images, video, and other multimedia content. PDAs, once the portable calendaring and organizational tool, now often include network communication capabilities such as e-mail, Internet access, etc. With the integration of wireless and landline network infrastructures, a multitude of new services are arising, and various information types can be conveniently communicated between wireless and/or landline terminals.

Services available over the Internet are referred to as "Web Services." In a particular case, "Web Services" refer to such Internet-available services when utilizing a standardized platform-independent messaging system such XML. The Web Services roles of the Web Services architecture include service providers, service requesters, and a service registry or broker. The service broker provides a registry and discovery mechanism for such services provided by service providers. While the Web Services protocol stack is evolving and may include many variations, XML-based Web Services include a number of layers including the service transport, XML messaging, service description, and service discovery layers. Each layer has different responsibilities to ultimately facilitate the communication of services over the Internet.

There are some Web Services that are intended to be offered by terminals, such that the terminals will behave as a Web Service Providers ("servers" in the classic terminology). An example of such a service is the Location service being defined by the Open Mobile Alliance (OMA). There are also Web Services that are to be directly used by terminals as Web Service Consumers ("client" in the classic terminology). An example of such a service may be an e-mail client embedded into the terminal using Web Service Protocols to connect to the mailing server.

There are at least two basic problems regarding Web Services offered or directly used by mobile terminals. First, the terminal needs to be addressed in both cases. The need for addressing may be trivial if the terminal operates as a server, but may also be needed if the terminal acts as a client. Even in the latter case there may be individual Web Service requests initiated by the server on the Internet, as there are, for example, in MM7 which is an OMA Web Service interface. In this case the HTTP doesn't solve the problem alone, but the terminal must be explicitly addressed.

A second basic problem is that the terminal owner's privacy should be protected. However, even the Mobile Station Integrated Services Digital Network (MSISDN) or the Session Initiation Protocol (SIP) address associated with the terminal is considered to be a personal data, as the user's behavior can easily be traced on the Internet with these identifiers. Therefore, for user privacy, third parties on the Internet should not know the mobile user's SIP address, MSISDN number, or other globally unique identifier.

These two issues are contradictory. Currently, the MSISDN number, SIP address, or other global identifier of the terminal would be used for terminal addressing associated with Web Services. A Wireless Application Protocol (WAP) push could be used to "wake up" the terminal, and the global identifier then used to address the terminal. However, user privacy is compromised in such situations.

Accordingly, there is a need in the telecommunications industry for a manner for addressing terminals without divulging private information of the terminal or terminal user. The present invention fulfills these and other needs, and offers other advantages over the prior art addressing approaches.

SUMMARY OF THE INVENTION

To overcome limitations in the prior art described above, and to overcome other limitations that will become apparent upon reading and understanding the present specification, the present invention discloses a system, apparatus and method for performing terminal address translation.

In accordance with one embodiment of the invention, a method is provided for identifying addresses of mobile terminals in a mobile network in order to communicate messages with the mobile terminals. The method includes receiving a message from a service consumer at a pseudonymity proxy operable within the mobile network, where the message includes an information exchange message including a pseudonym locally identifying a target mobile terminal. The pseudonym is translated into an address of the target mobile terminal unknown to the service consumer. The information exchange message is forwarded from the pseudonymity proxy to the address of the target mobile terminal.

In accordance with more particular embodiments of such a method, the information exchange message includes a Simple Object Access Protocol (SOAP) message. In a more particular embodiment, the pseudonym is received in the SOAP message via a header of the SOAP message. The header may include, for example, a header element including a SOAP attribute identifying a targeted recipient of information in the header, where the SOAP attribute may include a SOAP actor or role global attribute identifying the targeted recipient of the header information, or more generally may include a Uniform Resource Identifier (URI) identifying the targeted recipient of the header information. The header may further include, for example, a first child element of the header element, where the first child element includes the pseudonym and a pseudonym type in the form of a URI. In one particular embodiment, translating the pseudonym into an address of the target mobile terminal involves translating the pseudonym in a manner depending on the pseudonym type. In another particular embodiment, the header includes a first child element of the header element, the first child element comprising a pseudonym type in the form of a URI and a resolvable reference to the pseudonym. In a more particular embodiment, the header further includes an optional second child element of the header element, the second child element including the pseudonym data itself.

In another particular embodiment of such a method, translating the pseudonym into an address of the target mobile terminal involves resolving the pseudonym into an identifier unique to the terminal or terminal user, and resolving the identifier into the address of the target mobile terminal, where the manner of resolving the identifier into the address of the target mobile terminal is dependent on an identifier type. In one particular embodiment, such an identifier is in the form of a Session Initiation Protocol (SIP) address, where resolving the identifier into the address of the target mobile terminal involves retrieving the SIP address from a pseudonym resolution module, initiating a SIP session to a SIP proxy for transmitting the information exchange message, and via the SIP proxy, performing a location lookup for the target mobile terminal and returning a network address of the target mobile terminal to the pseudonymity proxy. In such an embodiment, forwarding the information exchange message may involve forwarding the information exchange message from the pseudonymity proxy to the network address of the target mobile terminal via a transport protocol message.

In another particular embodiment of such a method, translating the pseudonym into an address of the target mobile terminal involves parsing the message by the pseudonymity proxy to obtain the pseudonym and a URI associated with an identifier provider, forwarding the message by the pseudonymity proxy to the identifier provider addressed by the URI, locating and transmitting the address of the target mobile terminal via the identifier provider based on the pseudonym, and receiving the transmitted address of the target mobile terminal at the pseudonymity proxy. In an alternative embodiment, translating the pseudonym into an address of the target mobile terminal involves parsing the message by the pseudonymity proxy to obtain the pseudonym and a URI associated with an identifier provider, and locating the address of the target mobile terminal at the pseudonymity proxy based on the pseudonym. In another alternative embodiment, translating the pseudonym into an address of the target mobile terminal involves decrypting an encrypted MSISDN serving as the pseudonym by a mobile network operator. In yet another alternative embodiment, translating the pseudonym into an address of the target mobile terminal involves communicating a request including the pseudonym to an identifier provider within the mobile network to provide a globally unique identifier of the target mobile terminal in response to the request.

In another particular embodiment of such a method, a Web Service message including the information exchange message is sent from a service consumer to the pseudonymity proxy via a transport protocol. The Web Service message may be sent from the service consumer to the pseudonymity proxy utilizing, for example, any one of HTTP, SMTP, BEEP, and SIP as the transport protocol. In another particular embodiment, the Web Service message is sent from the service consumer via a first transport message, and where the information exchange message forwarded by the pseudonymity proxy is embedded within a second transport message.

In accordance with another embodiment of the invention, a Web Service Pseudonymity Proxy (WSPP) is provided for resolving pseudonyms to network addresses capable of addressing terminals on a network. The WSPP includes a message input to receive at least one message from a service consumer, the message having a message header including at least a header entry providing at least a pseudonym type and a pseudonym corresponding to a local identifier of a target mobile terminal. The WSPP includes a processing system configured to effect a translation of the pseudonym into a network address of the target mobile terminal as directed by the pseudonym type. A message output of the WSPP is provided to forward the message without the header entry to the target mobile terminal corresponding to the network address.

In accordance with yet another embodiment of the invention, a system is provided for resolving pseudonyms to network addresses capable of addressing terminals on a network. The system includes a service consumer coupled to the network and having access to various pseudonyms corresponding to a plurality of terminals, where the service consumer includes a server processing system configured to create and dispatch at least one message having a message header including a header entry providing at least a pseudonym type and a pseudonym corresponding to a local identifier of a target terminal. The system further includes a pseudonymity proxy coupled to the service consumer via the network to receive the messages identifying the pseudonymity proxy as the initial destination, where the pseudonymity proxy includes a proxy processing system configured to effect a translation of the pseudonym into a network address of the target terminal according to the pseudonym type, and configured to forward the message without the header entry to the target terminal corresponding to the network address.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described particular examples in accordance with the invention.

BRIEF DESCRIPTION OF THE DRAWINGS

The invention is described in connection with the embodiments illustrated in the following diagrams.

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a manner for performing terminal address translation. By providing a "pseudonym" to a pseudonymity proxy via particular information exchange parameters, a terminal can be addressed by its globally unique identifier even though the source does not know the globally unique identifier and only knows the pseudonym. The pseudonymity proxy therefore serves as an intermediary between various pseudonym provider systems and the underlying global addressing architectures. A "globally unique" identifier as used herein simply refers to an identifier uniquely associated with a particular terminal in the network(s).

The present invention thus allows Web Services to be provided to, or by terminals without giving out any personal information about the terminal or terminal user. The emerging Mobile Internet requires a manner of connecting mobile networks to the Internet or other network, and one such manner of making the connection is via such a Web Services paradigm. In the Web Services model, client systems interact with services using a model based on a rich set of meta-data made possible with, for example, interpretable Extensible Markup Language (XML). The transport is typically HTTP or based on the Simple Mail Transfer Protocol (SMTP). The Web Services paradigm is generally applicable to the Mobile domain as well. Web Services facilitates providing services over the Internet to appropriate service consumers.

Web Services are typically provided over a transport layer such as HTTP, SMTP, FTP, or other similar technology, and uses industry-standard software technologies such as XML, Simple Object Access Protocol (SOAP), Web Services Description Language (WSDL), Universal Description, Discovery and Integration (UDDI), etc. The key participants in a Web Service include service providers, service brokers, and service consumers. Service providers are participants who desire to publish a service as a Web Service. Service brokers are participants who provide a registry and discovery mechanism for such services provided by all service providers. This is done with the assistance of either directly maintaining a registry of such service descriptions, or by then providing value-added services over an existing Web Service registry. Service consumers are the immediate consumers of the Web Services offered by the service providers.

The basic process involved in the utilization of a Web Service includes the service provider providing a Web Service, which may be built from scratch or could wrap in existing legacy systems. A Web Service interface wraps the service, enabling an appropriate client to invoke the service interfaces with Web Service technologies. The service provider describes the service, its interfaces, and the mechanism to invoke the service interfaces in order to utilize their functionalities. This description utilizes a standard service description mechanism such as WSDL, which is then registered with the service brokers to allow discovery by the service consumers. The service providers use the interface provided by the service broker to manage the published service description. These Web Services interfaces provide an opportunity for carriers to offer their assets to any service provider who might benefit from such services. These assets may include, for example, billing capabilities, location or presence information, and the like. Service consumers utilize the Web Service interfaces provided by the service broker to discover and identify the correct Web Service. On finding the relevant Web Service description, the consumer will interpret the invocation mechanism described, and dynamically invoke and communicate with the Web Service found.

Currently, the communication between the service consumer, service provider, and service broker is often established by a SOAP-based interaction. SOAP provides a message framework, which defines the message structure and processing mechanism, a set of encoding rules to represent service-specific data types, and a convention to enable remote procedure calls or the exchange of messages. A SOAP message includes three main elements, including the root envelope element, an optional header element, and a body element. As is described in greater detail below, one embodiment of the invention is implemented using a terminal address proxy and using SOAP as the message framework to facilitate terminal address translation.

For purposes of the description provided herein, it is noted that the Web Service consumer (service consumer) generally refers to the entity that is using the service. For example, an entity may be a service provider in that it operates a web site and provides a service in that manner, yet be a consumer of the service provided by the mobile operator. In other words, the entity may be a service consumer because it uses the operator service in order to then act as a service provider via its web page to terminals. One aspect of the present invention involves the case where a Web Service is provided by a mobile terminal such as, for example, where the terminal provides its position if it includes the appropriate location-based functionality (e.g., Global Positioning System). The "service consumer" can be, for example, Internet based, that could operate a service that asks the mobile terminal directly about its position (assuming the proper positioning functionality). Thus, in embodiments of the present invention, the terminals serve as service providers, and third party or other entities on the network are service consumers in this scenario. Therefore, since embodiments of the invention involve the case where the Web Service is offered by the terminal, the "service consumer" generally refers to an entity that communicates with the WSPP of the present invention (e.g., the SOAP originator as subsequently described in connection with FIG. 2). It should be recognized that the present invention is also operable in the opposite direction, i.e., the server-to-terminal direction, although the various embodiments described herein generally refer to the case where the terminal serves as the service provider.

In accordance with the present invention, Web Services are provided by terminals without divulging any personal information of the terminal user. This is accomplished by coupling a pseudonym provider system and the underlying global addressing architectures via a terminal address translation module, referred to herein as the Web Service Pseudonymity Proxy (WSPP). In accordance with the invention, service consumers do not obtain any globally unique, traceable identifier of the mobile user. For example, a service consumer will remain unaware of the mobile user's MSISDN, the user's SIP address or the terminal's SIP address, etc. The service consumer, however, may be aware of or otherwise obtain a local identifier that is meaningful for that particular service consumer and not for other parties, and the user's behavior is not traceable given this local identifier. Such identifiers are referred to herein as "pseudonyms." Such a pseudonym may be resolved to a globally unique identifier of the user or its terminal.

The pseudonym resolution may be provided by different mechanisms, such as the Liberty Alliance Project system (hereinafter the "Liberty project") or other standard systems, or proprietary pseudonym solutions. For example, the Liberty project provides for a standardized, multivendor, Web-based single sign-on with federated identities. The Liberty project specifies identity providers (IDPs) that manage and store the different pseudonyms associated with the users. Further, rather than using such an IDP for pseudonym resolution, a proprietary pseudonym solution (such as provided by the assignee of the instant patent application) may be based on encryption of the MSISDN or similar identifier. In such a case, the service consumer can include the encrypted MSISDN (or other identifier) in a message that is given to it either by the user directly or through other means. The service consumer is unaware of the encryption key, and the encrypted MSISDN (or other identifier) is meaningless data to it. The WSPP has the key to decrypt the encrypted MSISDN (most probably different encryption keys for different service consumers), so the WSPP can decrypt the MSISDN rather than resolving identities across communication systems. In the case of Web Services offered by mobile terminals, the WSPP operated by a mobile operator may perform the translation of the pseudonym to the globally unique identifier. For example, the mobile operator may decrypt the MSISDN with the appropriate key, or may have the user's Liberty IDP within the operator domain and obtain the actual MSISDN of the user from the IDP.

Figure 1:
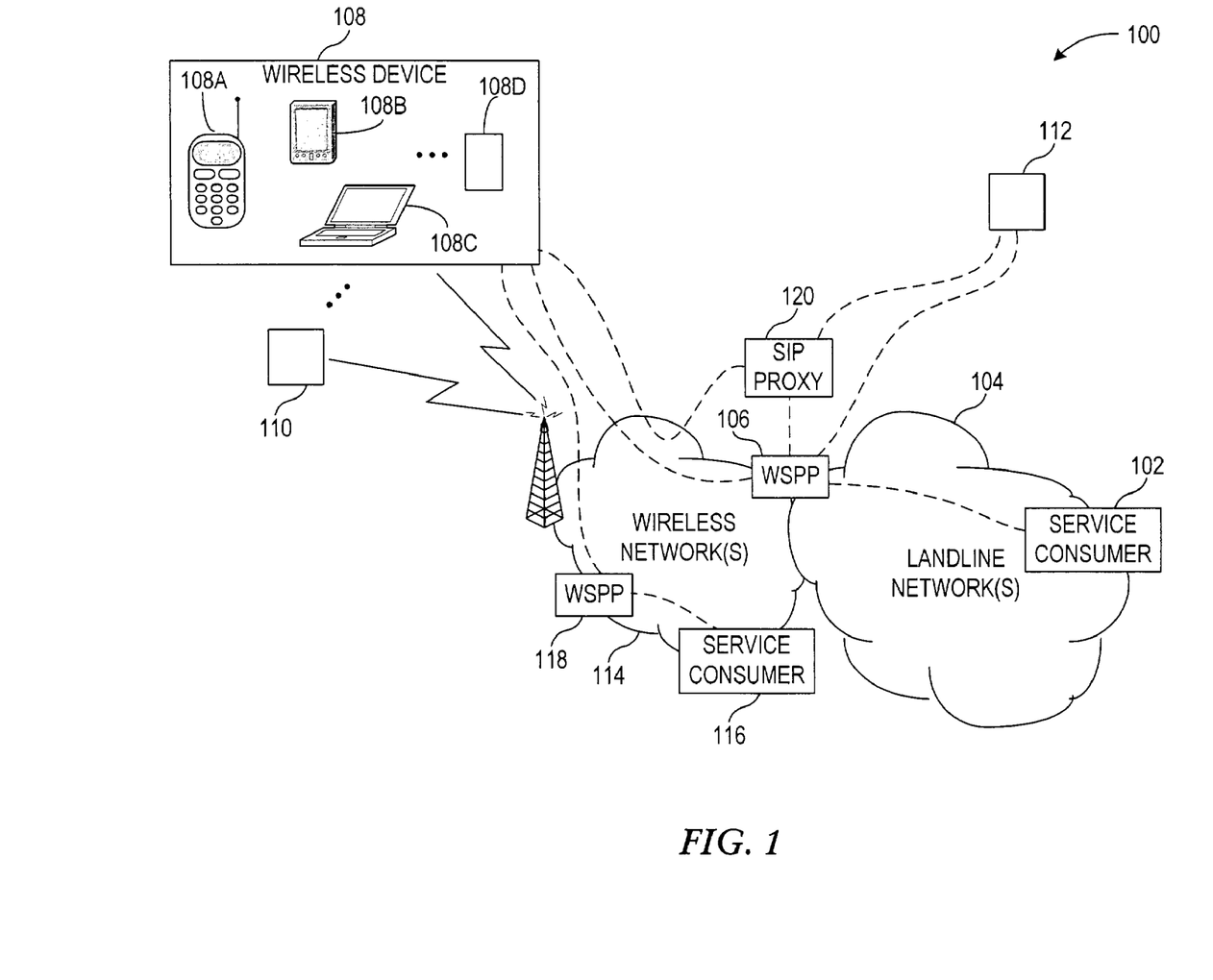
FIG. 1 illustrates a representative network implementing the principles of the present invention whereby service consumers can initiate Web Service transactions even if they only know the pseudonym associated with the user.

The present invention provides a manner by which a service consumer can initiate Web Service transactions targeting a terminal even if it only knows the pseudonym associated with the mobile user. FIG. 1 illustrates a representative network 100 implementing the principles of the present invention whereby service consumers can initiate Web Service transactions in such a manner. In the example of FIG. 1, a service consumer 102 may be coupled to a landline network(s) 104 such as the Internet. A Web Service Pseudonymity Proxy (WSPP) 106 is located inside the mobile operator network, and therefore can perform the terminal address translation or have it performed by a dedicated network element. Messages from the service consumer 102 and targeting a mobile terminal 108, 110 are thus sent through the WSPP 106. The terminals may be represented by terminal 112 coupled to landline networks 106, or mobile terminals 108, 110 which may include mobile phones 108A, Personal Digital Assistants (PDA) 108B, portable computing devices 108C, or other 108D wireless devices.

As shown in FIG. 1, the service consumer and/or WSPP may be coupled to a landline network 104 or a wireless network 114. Service consumer 102 may communicate via a WSPP 106 on the landline network(s) 104, which in turn may communicate over-the-air (OTA) with devices coupled to the wireless network(s) 114. A service consumer 116 may also communicate with terminals 108 wirelessly via a WSPP 118. In each instance, a WSPP 106, 118 is coupled within the operator network between service consumers and the terminals to which communication is to be effected. In one embodiment of the invention, the Session Initiation Protocol (SIP) may be used as a signaling protocol, in which case a SIP proxy 120 may serve as an intermediary between the WSPP 106 and the terminal 108.

In accordance with one embodiment of the invention, messages between the service consumers and the terminals are sent using the Simple Object Access Protocol (SOAP), which is an XML-based protocol. SOAP provides a message framework, which defines the message structure and processing mechanism, a set of encoding rules to represent service-specific data types, and a convention to enable remote procedure calls or the exchange of messages. In accordance with current SOAP specifications, SOAP messages may be transmitted through a number of hosts, referred to as SOAP intermediaries. An example of this is illustrated in FIG. 2, which is a block diagram of a basic network architecture incorporating a WSPP serving as a SOAP intermediary in accordance with the present invention.

Figure 2:
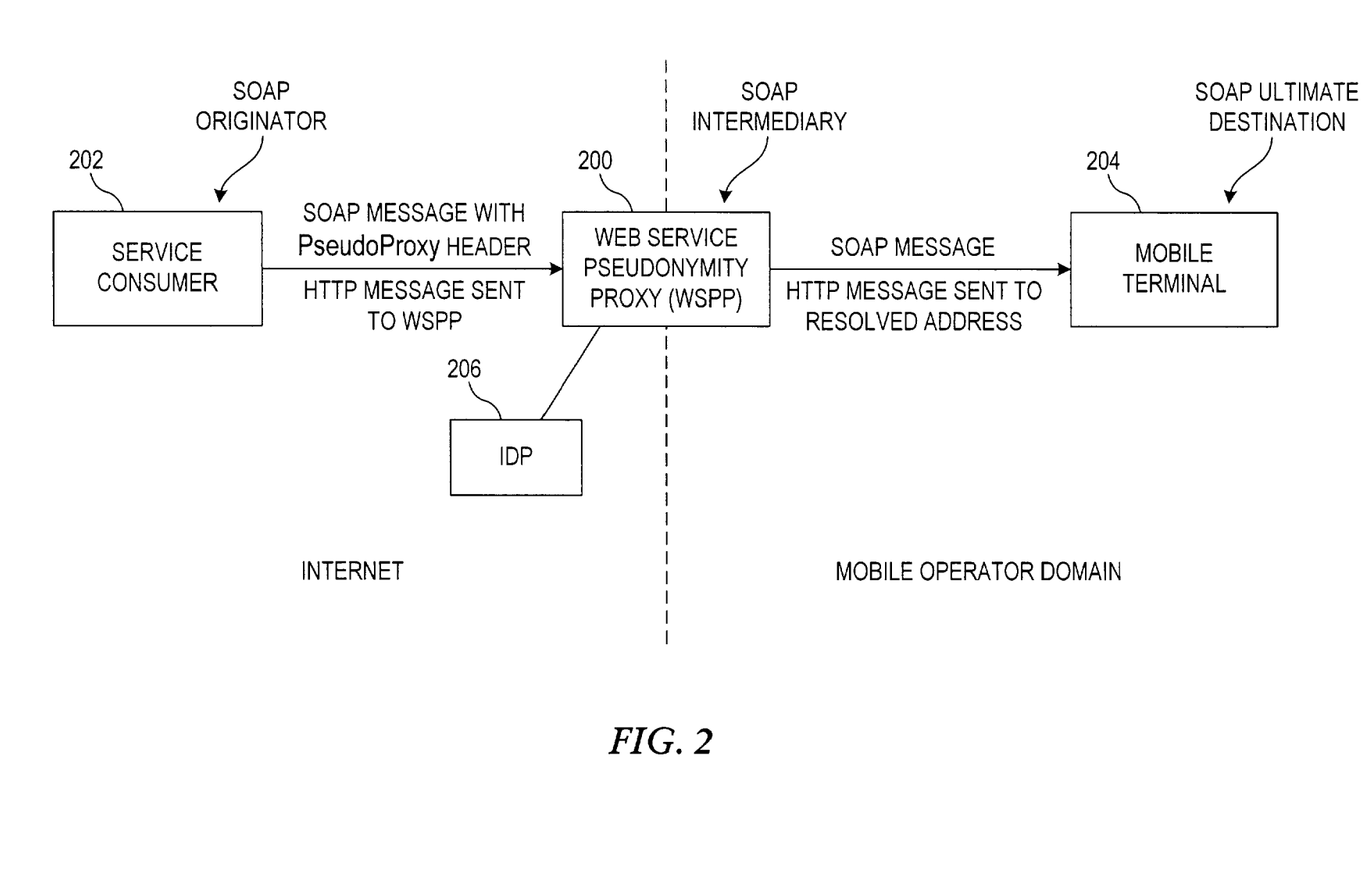
FIG. 2 is a block diagram of a basic network architecture incorporating a WSPP serving as a SOAP intermediary in accordance with the present invention.

The proxy solution shown in FIG. 2 addresses pseudonym translation for the terminal addressing. In this embodiment, the WSPP 200 of the present invention is implemented as a SOAP node. The service consumer 202 serves as the SOAP originator, and the mobile terminal 204 serves as the SOAP ultimate destination. As an example, a Hypertext Transfer Protocol (HTTP) message may be sent from the service consumer 202 to the WSPP 200. As is known in the art, HTTP is an application protocol, and more particularly is a set of rules for exchanging files (text, graphic images, sound, video, and other multimedia files) on a network such as the World Wide Web (WWW). Web Services represent a collection of several related technologies, and involve connections between at least two applications, such as a remote procedure call (RPC), in which queries and responses are exchanged in XML over HTTP. Web Service technologies may be defined in terms of various technology layers, where the core layers include a transport layer, such as TCP/IP or HTTP as previously described, in which XML messages may be communicated. An XML messaging layer, such as SOAP also represents a core layer of Web Services. SOAP defines a uniform manner of passing XML-encoded data, as well as defines a manner to perform RPCs using HTTP as the underlying communication protocol. Thus, in the illustrated example, XML-encoded data may be passed from the service consumer 202 to the WSPP 200 via a SOAP message using HTTP as the underlying communication protocol.

As previously described, SOAP messages may optionally include a header element. Such SOAP headers are independent from the other parts of the message and are processed only by a particular node in the message path. More particularly, a SOAP message travels from the originator to the ultimate destination, while possibly passing through one or more SOAP intermediaries which can both receive and forward SOAP messages. However, header elements may not be intended for the ultimate destination of the SOAP message, but rather may be intended for the next node or a particular node along the message path. Thus, a node receiving a header element must not forward that header element to the next application in the SOAP message path.

In accordance with one embodiment of the present invention, the user pseudonym used for the retrieval of the terminal address is contained in such a SOAP header element. It should be noted, however, that other messaging protocols may alternatively be used, such as XML-RPC or others. In the example of FIG. 2, a new SOAP header element is defined as the "PseudoProxy" header element which is included in the SOAP message to the WSPP 200. For example, the processing of the header may be associated with the "actor" as defined in W3C SOAP 1.1, or the "role" as defined in W3C SOAP 1.2. For example, the SOAP actor global attribute (e.g., a URI) of SOAP 1.1 can be used as the vehicle for identifying the recipient of the header element. In accordance with the invention, the URI can be, for example, as shown in Example 1 below:

http://www.standard.org/actor/PseudoProxy

EXAMPLE 1

This URI indicates that the header element is intended by the PseudoProxy, i.e., the WSPP 200. A child element(s) referred to herein as the "PseudoID" element may also be associated with the header element to indicate the particular "type" of pseudonym, such as LibertyToken, LibertyID, Wireless Village, etc. The value of the "PseudoID" element represents a URI that is to point to the XML element containing the pseudonym in the format of the type attribute. The manner in which a URI may be resolved as a link to an XML element is known in the art, e.g., as specified in the XPointer framework specification: W3C XPointer Framework; W3C Recommendation 25 Mar. 2003. Thus, depending on the type of pseudonym conveyed to the WSPP 200 via the SOAP header, the WSPP 200 can determine the location of the XML element that contains the pseudonym in the format of the type attribute identified via "PseudoID." An optional child element of the "PseudoProxy" header is "IDElement," which is a string that may contain the pseudonym itself, such as in the case where the pseudonym is in the form of an encoded MSISDN. If the "IDElement" header is not present, then the "PseudoID" refers to another header element that carries the pseudonym. This other header may be, e.g., a Liberty token, Web Services Security token, or other security tokens that may include a (pseudonym) identifier. Thus, the "PseudoID" header refers to the pseudonym itself. In one embodiment, the "IDElement" is included if there is no special security token in the message, that would contain the pseudonym, but it must be included in a "proprietary" way.

Thus, the WSPP 200 receives the SOAP message, and checks whether the "PseudoProxy" header is present with the appropriate actor, role, etc., and checks if the "PseudoID" element is present as a child of this header. If so, the WSPP 200 determines whether the type attribute of the "PseudoID" element is supported and known by the proxy implementation. The content of the "PseudoID" is resolved as a URI pointing to an XML element, for example, according to the XPointer framework. The WSPP 200 extracts the pseudonym from the XML information pointed to by the URI, which is then resolved to a network address of the mobile terminal 204. This resolvable address may be an IP address, a host name from the Domain Name System (DNS), a SIP address, or the like. A new transaction is initiated and sent to the resolved address of the mobile terminal 204, thereby forwarding the SOAP message without the "PseudoProxy" SOAP header. Note, that in this case the transport mechanism may also depend on the type of the network address of the terminal, but it could be HTTP if the network address can be used for addressing an HTTP transaction. In this manner, the message is provided from the service consumer 202 to the mobile terminal 204, without the service consumer requiring knowledge of the global identifier of the mobile terminal 204 as a result of the terminal address translation. It should be noted that the WSPP 200 may perform the identifier translation internally (i.e., internal IDP), or may outsource this function to an external IDP 206.

At the message level, one embodiment of the present invention utilizes new SOAP header and child elements as described above. A representative example of such header and child elements and the associated URIs are described. In accordance with one embodiment, the "PseudoProxy" SOAP header element is from a namespace, an example of which is shown in Example 2 below:

http://www.standard.org/schemas/PseudoProxy

EXAMPLE 2

The processing of the header is associated with the actor or role, as previously described in connection with Example 1 above. It may be beneficial that URIs such as those described in connection with Examples 1 and 2 are standardized by a standards body to facilitate interoperability.

A first child element described above is the "PseudoID" child element of the "PseudoProxy" element from the same namespace. As described above, it contains the type of the pseudonym in the form of a URI in the "type" attribute. This type attribute specifies the identifier system where the source identifier and the target identifier values are known. In one embodiment of the invention, these type attributes are provided in the form of URIs. Various ID types may exist, such as LibertyToken, LibertyID, Wireless Village, etc. The ID types shown in Table 1 below are illustrated as representative examples only, as any ID type may be contrived for use with the present invention.

TABLE 1

| ID TYPE | EXAMPLE URI VALUES |
| --- | --- |
| Liberty Token | http://www.standardbody.org/IDTypes/LibertyToken |
| Liberty ID | http://www.standardbody.org/IDTypes/LibertyID |
| Wireless Village | http://www.standardbody.org/IDTypes/WirelessVillage |
| Encrypted MSISDN | http://www.standardbody.org/IDTypes/EncryptedMSISDN |
| MSISDN | http://www.standardbody.org/IDTypes/MSISDN |
| Web Service Security Token | http://www.standardbody.org/IDTypes/WSS-Token |

The URI example for the "Liberty Token" type indicates that the source identifier is a Liberty authentication or authorization token containing the identifier of a user in either plaintext or encrypted form. The retrieval method of the identifier from the token is defined by the Liberty specification. The URI example for the "Liberty ID" type indicates that the source identifier is a valid identifier for a Liberty Identity Provider. In this case it is not a token, but rather the extracted identifier as a string. In such instances, it is assumed that a Liberty-compliant identity provider (IDP) will be available within the operator domain for making such look-up queries, in which case a Liberty IDP external to the operator domain (e.g., external to the mobile communication system) may be used. A Liberty IDP may alternatively be located directly within the mobile operator domain.

The URI example for the "Wireless Village" type indicates that the source identifier is a valid user ID in the Wireless Village system as a string. Other examples relate to the use of identifiers used to contact mobile subscribers, such as the Mobile Station Integrated Services Digital Network (MSISDN) number. The MSISDN is a number used to call a mobile subscriber, and currently includes a country code, a national destination code, and a subscriber number. One such URI example is for the MSISDN itself, where the source identifier is a valid MSISDN. Another related URI example is for an encrypted MSISDN, where the identifier is the same type that may be needed in the service request, but is encrypted with a shared secret key known by both the originator and the WSPP. In such case, the encryption method is also known by both parties. Still another URI example includes the "Web Service Security (WSS) Token" type which indicates that the source identifier may be retrieved from a linked WSS token as specified in the WSS-Core specification provided by the Web Service Security workgroup in the Organization for the Advancement of Structured Information Standards (OASIS).

Figure 3:
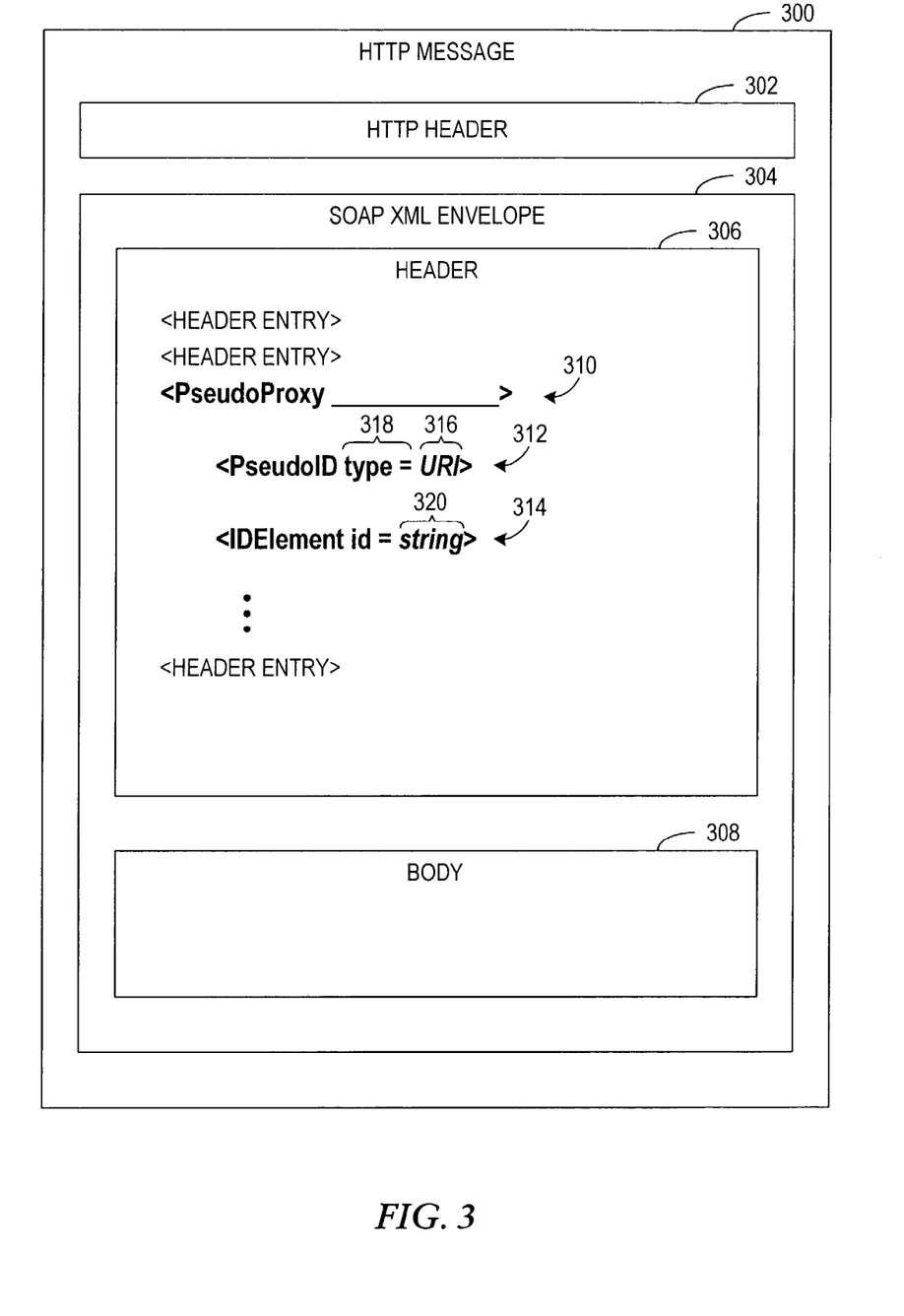
FIG. 3 is a diagram illustrating an exemplary message structure incorporating the header elements and child elements for communicating information between the source and the pseudonymity proxy in accordance with the present invention.

FIG. 3 is a diagram illustrating an exemplary message structure incorporating the header elements and child elements for communicating information between the source and the pseudonymity proxy in accordance with the present invention. This example is described in terms of SOAP messages and the underlying transport protocol HTTP, although the present invention is equally applicable to other transport protocols and information exchange protocols. For example, more recent transport protocols such as the Blocks Extensible Exchange Protocol (BEEP) allows for SOAP over BEEP. Other current (e.g., SMTP) or future transport protocols may similarly be used in connection with the present invention. HTTP is described as the transport protocol in this example because, currently, SOAP often uses HTTP as its transport protocol, largely due to the fact that HTTP is generally not stopped at firewalls.

Thus, in the illustrated example, the HTTP packet 300 uses a header 302 to denote the host system to which this packet is directed, the content of the packet (XML-based text in this case), and other information. The XML-based information in the illustrated example includes a SOAP envelope 304 which includes a SOAP header 306 and a SOAP body 308. In accordance with the present invention, one of the header elements is the "PseudoProxy" header element 310. Associated with this header element are child elements "PseudoID" 312 and "IDElement" 314. As previously described, the "PseudoID" child element contains the type of the pseudonym in the form of a URI 316 associated with the type 318 attribute. The various URIs 316 may be any URI identifying an identifier type, such as those described in connection with Table 1 above.

The "IDElement" 314 is an optional child element of the "PseudoProxy" header 310 from the same namespace (e.g., www.standard.org/schemas/PseudoProxy). In one embodiment, it is represented by a string 320, and may contain the pseudonym data (for example, the encoded MSISDN). It may have an unqualified attribute called "encoding." In one embodiment, its default value is "base64," and by setting it to "base64" the BASE64 encoding of the content is indicated. The "IDElement" may also be present in other SOAP headers, such as an "IdTrans" header as defined in co-pending U.S. patent application Ser. No. 10/287,462, entitled "User-Identifier Translator and Linking Apparatus for XML-Based Services and Corresponding Method." If such a header already exists, it is possible to avoid the repetition of the "IDElement" in the "PseudoProxy" header, and rather link the one in the "IdTrans" header.

Figure 4:
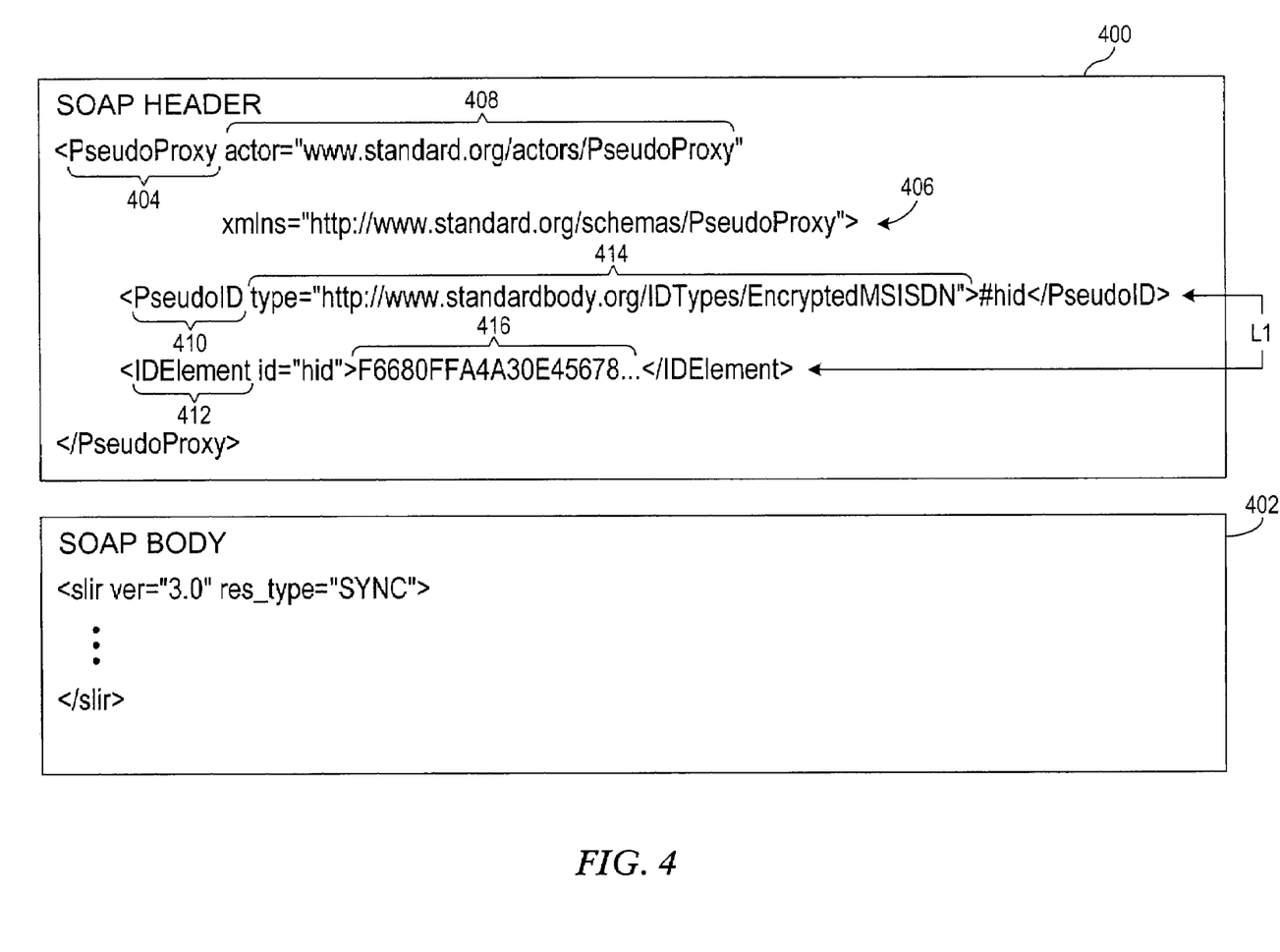
FIG. 4 illustrates a sample SOAP message including the extension information in accordance with the present invention.

FIG. 4 illustrates a sample SOAP message including the extension information in accordance with the present invention. The SOAP message includes the SOAP header 400 and the SOAP body 402. The "PseudoProxy" header element 404 includes a namespace 406 as well as an "actor" attribute 408. In the illustrated embodiment, the processing of the header is associated with the actor as defined in SOAP 1.1. This header thus identifies the "PseudoProxy" (i.e., the WSPP) as the recipient of the SOAP message.

The SOAP header 400 may also include child elements of the "PseudoProxy" header, including the "PseudoID" element 410 and the "IDElement" 412. The previously discussed type attribute and corresponding URI 414 is illustrated in FIG. 4 as an encrypted MSISDN type. In this case, the "IDElement" 412 includes an encrypted pseudonym 416. A link LI shows the link to the element containing the user pseudonym. This link, however, may alternatively point into another SOAP header, such as a Liberty assertion containing the user pseudonym as previously indicated and described in greater detail in co-pending U.S. patent application Ser. No. 10/287,462, entitled "User-Identifier Translator and Linking Apparatus for XML-Based Services and Corresponding Method," the content of which is incorporated herein by reference.

Figure 5:
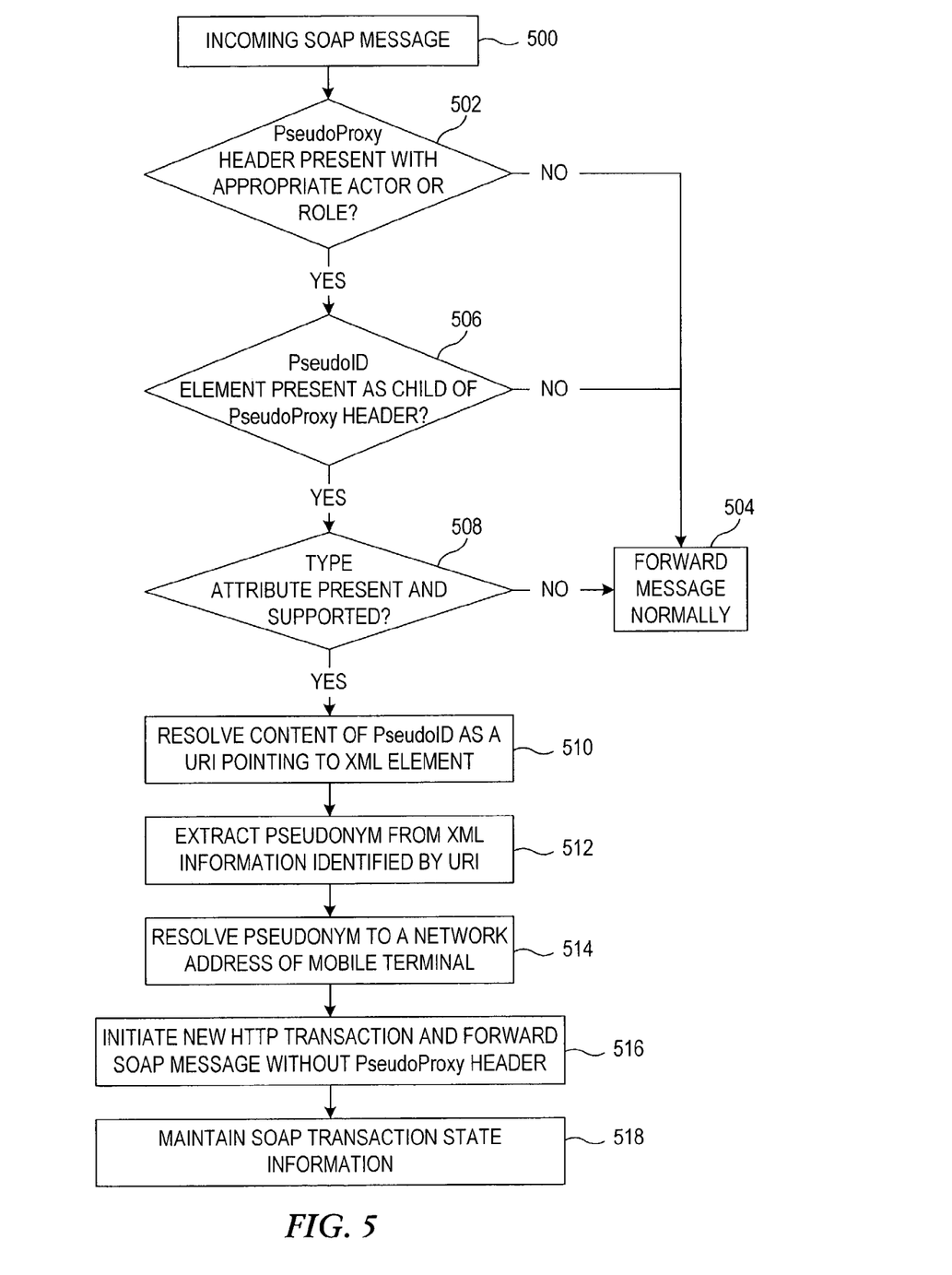
FIG. 5 is a flow diagram illustrating one embodiment in which the WSPP processes an incoming SOAP message.

FIG. 5 is a flow diagram illustrating one embodiment in which the WSPP processes an incoming SOAP message 500. It is determined 502 whether the "PseudoProxy" header element is present with the appropriate actor or role (or other analogous attribute related to SOAP or other information exchange protocol). If not, the transport protocol message, an HTTP message in the current example, is forwarded 504 normally. If the "PseudoProxy" header element is present, it is determined 506 whether the "PseudoID" element is present as a child of the "PseudoProxy" header element. If so, the type attribute of the "PseudoID" element is checked 508 to determine whether it is supported and known by the WSPP. If so, processing continues by resolving 510 the content of the "PseudoID" as a URI pointing to an XML element, such as in accordance with the XPointer framework. The pseudonym is extracted 512 from the XML information pointed to by the URI, and the pseudonym is resolved 514 to a network address of the mobile terminal. The resolution 514 of the pseudonym to a network address of the mobile terminal may involve intermediate steps, which is described more fully in connection with FIG. 6. A new HTTP (or other transport protocol) transaction is then initiated 516, and the SOAP message is forwarded without the "PseudoProxy" header. SOAP transaction state information may be maintained 518. In this manner, an incoming message associated with a local pseudonym may be translated to a network address of the mobile terminal, without the source (e.g., service consumer) having to be aware of the network address or other global identifier of the mobile terminal.

Figure 6:
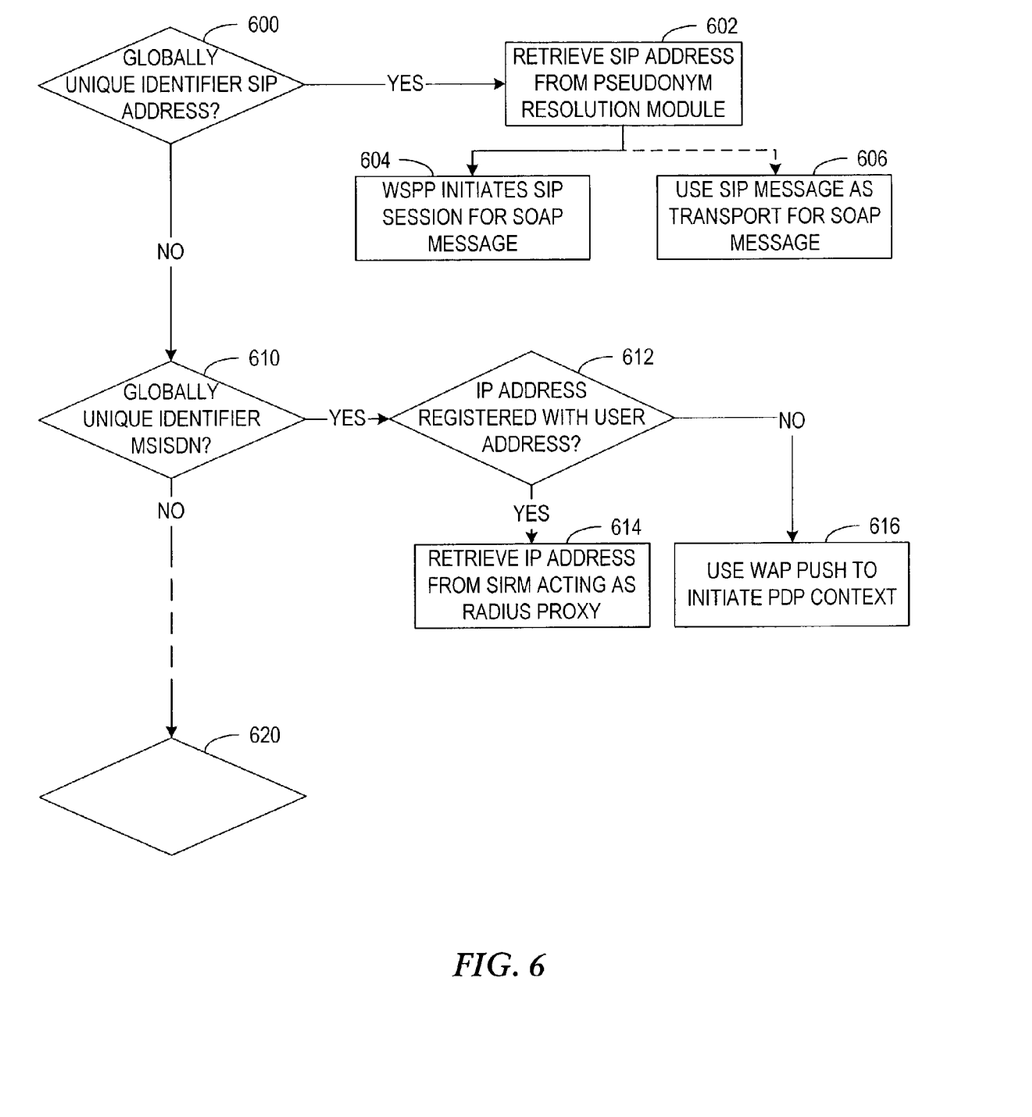
FIG. 6 is a flow diagram illustrating an exemplary manner in which the network address may be resolved.

As indicated above, the resolution of the pseudonym to a network address of the mobile terminal may involve intermediate steps. FIG. 6 is a flow diagram illustrating an exemplary manner in which the network address may be resolved. The pseudonym identifier supplied by the service consumer is resolved into a globally unique identifier of the user. However, based on the type of the user, this globally unique identifier is not necessarily a real network address, and therefore the globally unique identifier may need to be resolved into an actual network address of the mobile terminal. FIG. 6 illustrates one manner for resolving various representative global identifiers into network addresses.

The manner in which network address resolution occurs may depend on the type of global identifier. For example, if the globally unique identifier is a Session Initiation Protocol (SIP) address as determined at decision block 600, then the SIP address is retrieved 602 from the pseudonym resolution module. The WSPP then initiates 604 a SIP session for a SOAP message with, for example, a SIP INVITE message with a media descriptor such as shown in Examples 3 and 4 below:

m=control 80 HTTP/TCP text/xml (for SOAP 1.1)

EXAMPLE 3 m=control 80 HTTP/TCP application/soap+xml (for SOAP 1.2)

EXAMPLE 4

SIP performs the location lookup for the mobile terminal and returns the network address in the SIP response message, such as in the origin "o= . . . " attribute of the SIP response message. After this point, the returned address may be used as the target of the HTTP address. A major advantage of the SIP-based WSPP is that from the service consumer point of view, the services offered by the mobile terminal can be used even in the case when the user is roaming (assuming a trust relationship between the mobile operators). An example of a SIP implementation is illustrated in connection with FIG. 8.

Alternatively, as shown at block 606, a SIP message may be used as the transport for the SOAP message if SIP is established as a Web Service transport protocol between the WSPP and the terminal.

The globally unique identifier may be an MSISDN as determined at decision block 610. If there is no IP address registered with the user address as determined at decision block 612, then a Wireless Application Protocol (WAP) push may be used, for example, to initiate a Packet Data Protocol (PDP) context in the case of General Packet Radio Access (GPRS) access. This is illustrated at block 616. Recognizing at decision block 612 that there is no registered IP address is indicative of no activated PDP context in the case of GPRS access.

On the other hand, the IP address needed for mobile terminal addressing can be retrieved from a Subscriber Identification Resolution Module (SIRM) that acts as a Remote Authentication Dial In User Service (RADIUS) proxy in the mobile operator network, as illustrated at block 614. As is known in the art, RADIUS is a protocol for carrying authentication, authorization, and configuration information between a Network Access Server (which desires to authenticate its links) and a shared Authentication Server. The function shown at block 614 works for both in circuit-switched data and GPRS data access. Other/different global unique identifiers may need to be resolved, as depicted by block 620.

Figure 7:
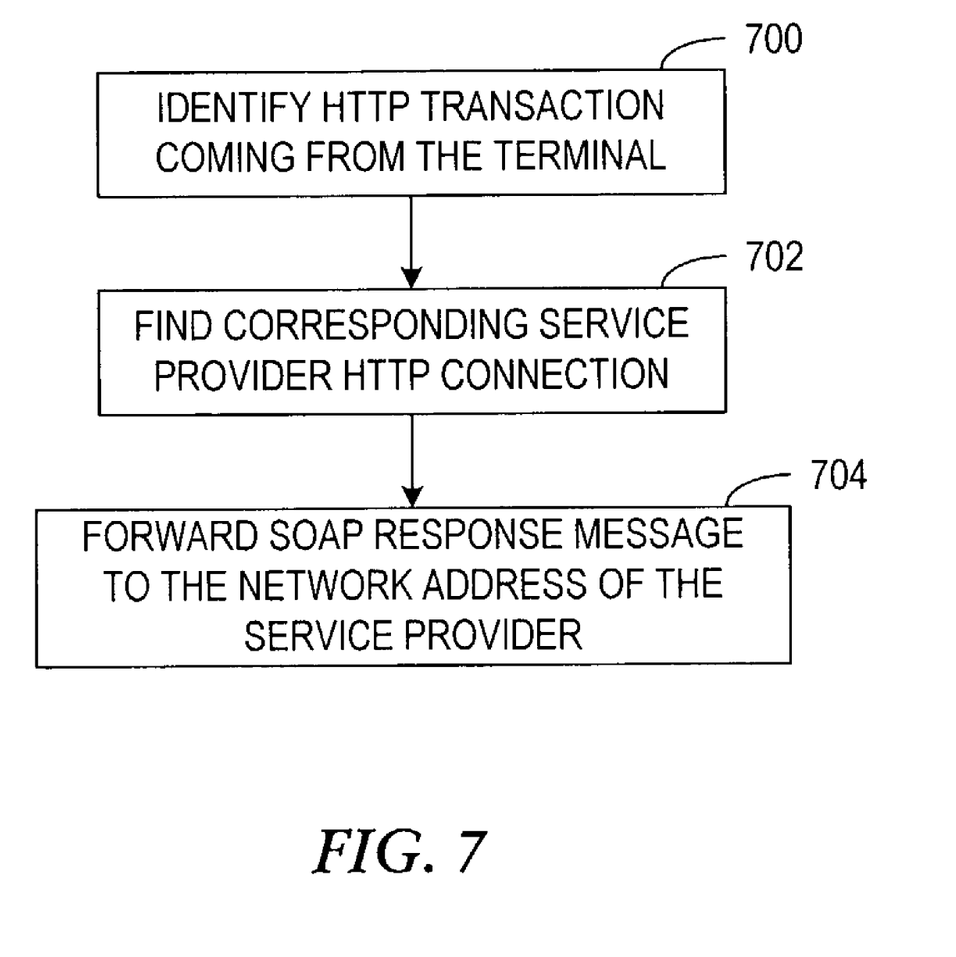
FIG. 7 is a flow diagram illustrating one embodiment in which the WSPP processes an outgoing SOAP message.

FIG. 7 is a flow diagram illustrating one embodiment in which the WSPP processes an outgoing SOAP message. The HTTP transaction coming from terminal is identified 700, and the corresponding service consumer HTTP connection is located 702. The SOAP response message is then forwarded 704 to the network address of the service consumer.

Figure 8:
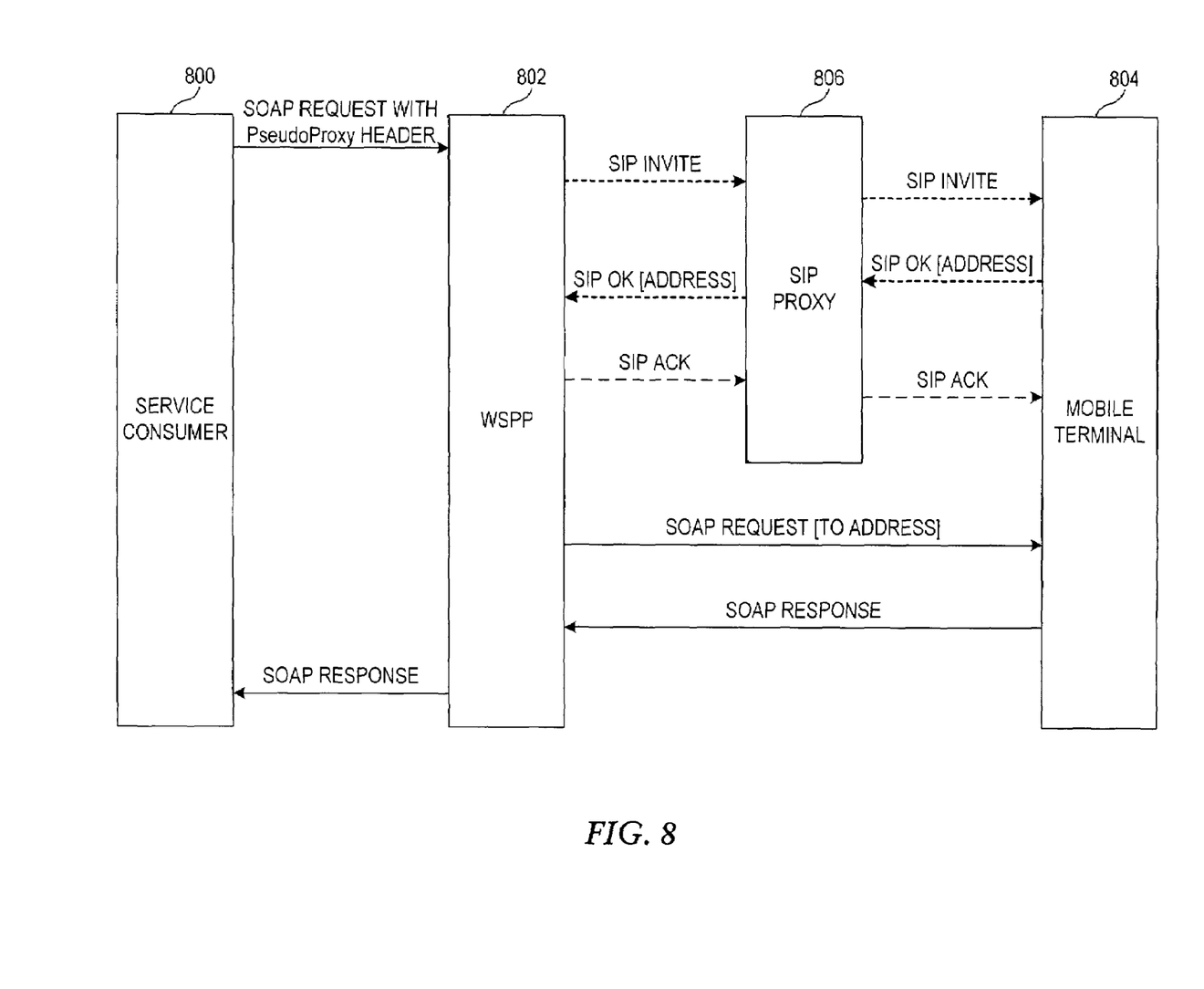
FIG. 8 is a block diagram of a network architecture incorporating a WSPP in accordance with the present invention, where SIP-based mobile terminal addressing is employed.

FIG. 8 is a block diagram of a network architecture incorporating a WSPP in accordance with the present invention, where SIP-based mobile terminal addressing is employed. The service consumer 800, WSPP 802, and mobile terminal 804 operate as previously described. A SOAP request with the PseudoProxy header is sent from the service consumer 800 to the WSPP 802. In this embodiment, a SIP proxy 806 is involved in the message sequence, and is used for the terminal address lookup. More particularly, the WSPP 802 sends a SIP INVITE to the SIP proxy 806, which is forwarded to the mobile terminal 804. If the INVITE is successful, the mobile terminal returns a SIP OK (i.e., 200 OK) and the address of the mobile terminal 804. The SIP proxy 806 returns the SIP OK and address to the WSPP 802, which then provides an acknowledge (ACK) message to the mobile terminal 804. At this point, the WSPP 802 can forward the SOAP request to the specified address of the mobile terminal 804, and receive a SOAP response. In this manner, terminal services can be used by the service consumer 800 normally, even when the terminal is roaming.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather defined by the claims appended hereto.

What is claimed is:

1. A method comprising:
   receiving a message from a service consumer at a pseudonymity proxy within the mobile network, wherein the message includes a Simple Object Access Protocol (SOAP) message including a pseudonym identifying a target mobile terminal via a header of the SOAP message;
   determining, via the pseudonymity proxy, a header element of the header that includes a SOAP attribute identifying a targeted recipient of information in the header, the header element including a child element providing at least a pseudonym type and the pseudonym;
   resolving the pseudonym type and the pseudonym as a Uniform Resource Identifier (URI) pointing to an XML element;
   extracting the pseudonym from the XML element pointed to by the URI;
   resolving the pseudonym into an address of the target mobile terminal unknown to the service consumer; and
   forwarding the SOAP message from the pseudonymity proxy to the address of the target mobile terminal.

2. The method of claim 1, wherein the SOAP attribute comprises a SOAP actor or role global attribute identifying the targeted recipient of the header information.

3. The method of claim 1, wherein the SOAP attribute comprises a Uniform Resource Identifier (URI) identifying the targeted recipient of the header information.

4. The method of claim 1, wherein the header further comprises a first child element of the header element, the first child element comprising the pseudonym, and a pseudonym type in the form of a URI.

5. The method of claim 4, wherein translating the pseudonym into an address of the target mobile terminal comprises translating the pseudonym in a manner depending on the pseudonym type.

6. The method of claim 4, wherein the URI identifies an XML element containing the pseudonym in a format corresponding to the pseudonym type.

7. The method of claim 6, further comprising resolving the URI as a link to the XML element in accordance with an XPointer framework.

8. The method of claim 1, wherein the header further comprises a first child element of the header element, the first child element comprising a pseudonym type in the form of a URI and a resolvable reference to the pseudonym.

9. The method of claim 8, wherein the header further comprises an optional second child element of the header element, the second child element comprising the pseudonym data itself.

10. The method of claim 9, wherein the pseudonym data comprises an encrypted MSISDN.

11. The method of claim 1, wherein resolving the pseudonym into an address of the target mobile terminal comprises determining, via the pseudonymity proxy, whether the header includes header element including the SOAP attribute identifying the targeted recipient of information in the header, and whether the header element includes the child element providing at least the pseudonym type and the pseudonym.

12. The method of claim 11, if the header element and child element are present, determining whether the pseudonym type is supported by the pseudonymity proxy, and if so, resolving the pseudonym type and the pseudonym as the URI pointing to the XML element.

13. The method of claim 12, further comprising resolving the pseudonym to the address of the target mobile terminal via a pseudonym resolution module.

14. The method of claim 13, wherein forwarding the information message from the pseudonymity proxy to the address of the target mobile terminal comprises forwarding the SOAP message without the header element to the target mobile terminal.

15. A method comprising:
receiving a message from a service consumer at a pseudonymity proxy operable within the mobile network, wherein the message includes an information message including a pseudonym locally identifying a target mobile terminal;
translating the pseudonym into an address of the target mobile terminal unknown to the service consumer, wherein translating the pseudonym into an address of the target mobile terminal comprises:
resolving the pseudonym into an identifier unique to the terminal or terminal user, wherein the identifier comprises a Session Initiation Protocol (SIP) address; and
resolving the SIP address into the address of the target mobile terminal, wherein the manner of resolving the identifier into the address of the target mobile terminal is dependent on an identifier type, and wherein resolving the identifier into the address of the target mobile terminal comprises:

(i) retrieving the SIP address from a pseudonym resolution module;
(ii) initiating a SIP session to a SIP proxy for transmitting the information message;
(iii) via the SIP proxy, performing a location lookup for the target mobile terminal and returning a network address of the target mobile terminal to the pseudonymity proxy; and
forwarding the information message from the pseudonymity proxy to the address of the target mobile terminal, wherein forwarding the information message comprises forwarding the information message from the pseudonymity proxy to the network address of the target mobile terminal via a transport protocol message.

16. The method of claim 15, wherein the transport protocol message comprises an HTTP message, and wherein the information message comprises a SOAP message.

17. The method of claim 15, wherein the transport protocol message comprises a SIP message used as the transport for the information message, wherein the information message comprises a SOAP message.

18. The method of claim 15, wherein the identifier comprises a Mobile Station Integrated Services Digital Network (MSISDN) identifier, and wherein resolving the identifier into an address of the target mobile terminal comprises retrieving an Internet Protocol (IP) address of the target mobile terminal from a subscriber identification resolution module serving as a Remote Authentication Dial In User Service (RADIUS) proxy in a mobile operator network.

19. The method of claim 18, wherein no IP address is registered with the identifier, and further comprising utilizing a Wireless Application Protocol (WAP) push to initiate a Packet Data Protocol (PDP) context for General Packet Radio Access (GPRS) access.

20. The method of claim 1, wherein resolving the pseudonym into an address of the target mobile terminal comprises:
parsing the message by the pseudonymity proxy to obtain the pseudonym and a URI associated with an identifier provider;
forwarding the message by the pseudonymity proxy to the identifier provider addressed by the URI;
locating and transmitting the address of the target mobile terminal via the identifier provider based on the pseudonym; and
receiving the transmitted address of the target mobile terminal at the pseudonymity proxy.

21. The method of claim 1, wherein resolving the pseudonym into an address of the target mobile terminal comprises:
parsing the message by the pseudonymity proxy to obtain the pseudonym and a URI associated with an identifier provider; and
locating the address of the target mobile terminal at the pseudonymity proxy based on the pseudonym.

22. The method of claim 1, wherein resolving the pseudonym into an address of the target mobile terminal comprises decrypting an encrypted MSISDN serving as the pseudonym by a mobile network operator.

23. The method of claim 1, wherein resolving the pseudonym into an address of the target mobile terminal comprises communicating a request including the pseudonym to an identifier provider within the mobile network to provide a globally unique identifier of the target mobile terminal in response to the request.

24. The method of claim 1, further comprising sending a Web Service message including the information message from a service consumer to the pseudonymity proxy via a transport protocol.

25. The method of claim 24, wherein sending the Web Service message from the service consumer to the pseudonymity proxy via a transport protocol comprises sending the message and the information message from the service consumer to the pseudonymity proxy utilizing any one of HTTP, SMTP, BEEP, and SIP as the transport protocol.

26. The method of claim 1, wherein a Web Service message sent from the service consumer comprises a first transport message, and wherein the information message forwarded by the pseudonymity proxy is embedded within a second transport message.

27. A computer-usable medium having instructions stored thereon which are executable by a computer system for identifying globally unique identifiers of mobile terminals by performing steps comprising:

parsing a message received from a service consumer within a mobile network, the message including a Simple Object Access Protocol (SOAP) message including a pseudonym identifying a target mobile terminal via a header of the SOAP message;

determining a header element of the header that includes a SOAP attribute identifying a targeted recipient of information in the header, the header element including a child element providing at least a pseudonym type and the pseudonym;

resolving the pseudonym type and the pseudonym as a Uniform Resource Identifier (URI) pointing to an XML element;

extracting the pseudonym from the XML element pointed to by the URI;

resolving the pseudonym to an address of the target mobile terminal unknown to the service consumer; and forwarding the information message from the pseudonymity proxy to the address of the target mobile terminal.

28. An apparatus comprising:

a computing system and memory coupled to the computing system, the memory having instructions that cause the computing system to:

parse a message received from a service consumer within a mobile network, the message including an information a Simple Object Access Protocol (SOAP) message including a pseudonym identifying a target mobile terminal via a header of the SOAP message;

determine a header element of the header that includes a SOAP attribute identifying a targeted recipient of information in the header, the header element including a child element providing at least a pseudonym type and the pseudonym;

resolve the pseudonym type and the pseudonym as a Uniform Resource Identifier (URI) pointing to an XML element;

extract the pseudonym from the XML element pointed to by the URI;

resolve the pseudonym to an address of the target mobile terminal unknown to the service consumer; and forward the information message to the address of the target mobile terminal.

\* \* \* \* \*

UNITED STATES PATENT AND TRADEMARK OFFICE
CERTIFICATE OF CORRECTION

| | | |
|---|---|---|
| PATENT NO. | : 7,418,485 B2 | Page 1 of 1 |
| APPLICATION NO. | : 10/422352 | |
| DATED | : August 26, 2008 | |
| INVENTOR(S) | : Payrits | |

It is certified that error appears in the above-identified patent and that said Letters Patent is hereby corrected as shown below:

Column 15, Claim 11, line 32: "includes header" should be --includes the header--.

Signed and Sealed this

Sixteenth Day of December, 2008

JON W. DUDAS
*Director of the United States Patent and Trademark Office*